United States Patent [19]
Rosen et al.

[11] Patent Number: 5,770,909
[45] Date of Patent: Jun. 23, 1998

[54] WOUND ROTOR SYNCHRONOUS MOTOR-GENERATOR AND FIELD CONTROL SYSTEM THEREFOR

[75] Inventors: Harold A. Rosen, Santa Monica; Brian R. Jensen, Simi Valley; Thomas Hudspeth, Malibu, all of Calif.

[73] Assignee: Rosen Motors, L.P., Woodland Hills, Calif.

[21] Appl. No.: 764,589

[22] Filed: Dec. 13, 1996

[51] Int. Cl.[6] .......................... H02K 47/04; H02K 16/00; H02P 9/14
[52] U.S. Cl. ............................ 310/113; 310/114; 322/89
[58] Field of Search ................................... 310/113, 114, 310/68 D; 336/115, 118, 119, 120, 130, 132; 322/28, 58, 89

[56] References Cited

U.S. PATENT DOCUMENTS

| | | | |
|---|---|---|---|
| 3,522,520 | 8/1970 | Goldman | 322/28 |
| 3,614,593 | 10/1971 | Lace | 322/28 |
| 4,041,541 | 8/1977 | Frossard et al. | 310/68 C |
| 4,210,857 | 7/1980 | Korbell | 322/28 |
| 4,355,276 | 10/1982 | Vittay | 310/74 |
| 4,612,486 | 9/1986 | Ban et al. | 310/113 |
| 4,625,160 | 11/1986 | Hucker | 310/115 |
| 4,841,216 | 6/1989 | Okada et al. | 322/29 |
| 4,922,179 | 5/1990 | Nishimura | 322/25 |
| 5,023,537 | 6/1991 | Baits | 322/25 |
| 5,519,275 | 5/1996 | Scott et al. | 310/112 |
| 5,587,641 | 12/1996 | Rozman | 318/801 |
| 5,627,422 | 5/1997 | Boggs, III et al. | 310/105 |

*Primary Examiner*—Clayton E. Laballe
*Attorney, Agent, or Firm*—Raymond H.J. Powell, Jr.

[57] ABSTRACT

A field control system for a wound rotor synchronous motor-generator used in electrically powered automobiles is capable of optimizing the performance of the motor-generator for all driving conditions. Using a rotary transformer to transmit power across the rotational boundary, it has no wearing parts and is silent. Preferably, the field control system has common elements with the controller which generates the stator currents of the synchronous motor-generator.

5 Claims, 5 Drawing Sheets

WOUND ROTOR SYNCHRONOUS MOTOR-GENERATOR AND FIELD CONTROL SYSTEM THEREFOR

BACKGROUND OF THE INVENTION

1. Field of the Invention

The present invention relates to a wound rotor synchronous machine. More specifically, the present invention relates to improved structures and systems for transmission of current to the rotor of a wound rotor synchronous electrical machine so as to create and control the rotating magnetic field.

2. Brief Description of Related Art

Wound rotors are used on electrical machines in order to permit control of the excitation field by adjusting the current in the rotating field windings. In the case of aircraft generators, which generally operate over a very limited speed range, a multipole permanent magnet on the rotor generates an A.C. voltage on a stationary winding. The current induced by the stationary winding voltage is appropriately controlled and reintroduced into the rotating windings, i.e., field winding, via a rotary transformer. The current in the secondary windings of the rotary transformer is first rectified, and then fed into the field windings of the wound rotor. It will be appreciated that the voltage produced by the wound rotor generator is regulated by level control of the field current in the field windings.

In the case of motor-generators which must operate over a wide range of speeds, i.e., standstill through several thousand revolutions per minute (rpm), the arrangement discussed immediately above will not work, since some rotational speed is needed to generate the control current applied to the field windings. In order to overcome this limitation in the speed range of a wound rotor machine, slip rings are often used to transfer field control current from a stationary source to the field windings of the rotor. It will be appreciated that this overcomes the problem of starting a wound rotor synchronous machine in a motor mode of operation but creates a serious maintenance problem. For high speeds, slip rings have limited life. Moreover, slip rings are a significant source of unwanted noise, both electrical and mechanical.

What is needed is a wound rotor synchronous motor-generator system providing a quiet, reliable way of creating and controlling the rotor field of high speed synchronous motor-generators. In addition, it is highly desirable that the rotor field control circuitry share as many of the elements of the stator electronic control system as possible.

SUMMARY OF THE INVENTION

Based on the above and foregoing, it can be appreciated that there presently exists a need in the art for a wound rotor synchronous motor-generator system which overcomes the above-described deficiencies. The present invention was motivated by a desire to overcome the drawbacks and shortcomings of the presently available technology, and thereby fulfill this need in the art.

Moreover, the present invention provides a quiet, reliable system for creating and controlling the rotor field of high speed wound rotor synchronous motor-generators, which has many elements in common with the associated stator electronic control system.

An object of the present invention is to provide a field control system for a wound rotor synchronous motor-generator wherein a stationary power source supplying field current shares a processor, a D.C. bus, a power switch cooling loop, and a high frequency carrier with the system used to generate the stator signals of the wound rotor synchronous motor-generator.

Another object according to the present invention is to provide a field control system wherein the field current can be adjusted to provide optimum motor-generator performance for all shaft speeds and torque demands on the motor-generator.

Still another object according to the present invention is to provide a field control system wherein the optimum current for any drive condition is computed in the same digital signal processor that generates the signals controlling supplied stator current.

Yet another object of the present invention is to provide a power conditioning filter that reduces the voltage transients on the diodes in a rectifier. According to one aspect of the present invention, filtering reduces the voltage transients experienced by the diodes, thereby reducing the required diode voltage rating. It will be appreciated that a reduced voltage rating translates directly into lower costs while increasing diode efficiency.

These and other objects, features and advantages according to the present invention are provided by a field control system for a wound rotor synchronous motor-generator. The field control system includes an adjustable power source operatively connected to the wound rotor synchronous motor-generator, a rotary transformer disposed within the wound rotor synchronous motor-generator for receiving power from the adjustable power source and generating field current, a rectifier receiving the field current and generating rectified field current applied to the wound rotor of the wound rotor synchronous motor-generator, and a filter serially connected between the power source and the rotary transformer for generating a sinusoidal waveform from a rectangular waveform produced by the stationary power source.

These and other objects, features and advantages according to the present invention are provided by a rotary transformer for a rotating machine, which includes a stationary portion and a rotating portion. Preferably, the stationary portion includes a ferrite first core and a first winding disposed with the first core while the rotating portion includes a ferrite second core, a second winding disposed with the second core, and a ring member operatively coupled to the second core, the ring member having an inner surface adapted for supporting rectifier elements against centrifugal force generated by rotation of the ring member and an outer surface adapted for supporting radiator elements for cooling the rectifier elements.

These and other objects, features and advantages according to the present invention are provided by a rotating machinery system including a wound rotor synchronous machine, a stator current control subsystem, and a rotor current control subsystem.

Preferably, the stator current control subsystem includes:

- a digital signal processor receiving a torque command signal and a timing signal indicative of the shaft rotational position and speed, and generating first and second control signals;
- a frequency generator for generating a fixed high frequency signal responsive to the second control signal;
- a first pulse width modulator for generating first modulated control signals responsive to the first control signal and the high frequency signal; and a plurality of insulated gate bipolar transistors (IGBTs) generating stator currents response to an applied DC voltage and the first modulated control signal.

Moreover, the rotor current control subsystem preferably includes:

the digital signal processor, wherein the digital signal processor generates a third control signal;

the frequency generator;

a second pulse width modulator for generating second modulated control signals responsive to the third control signal and the high frequency signal;

an insulated gate bipolar transistor (IGBT) generating rotor current responsive to an applied DC voltage and the second modulated control signals; and a filter serially connected between the IGBT and the rotating machine for converting rectangular waveforms generated by the IGBT into sinusoidal waveforms applied to the rotating machine.

According to one aspect of the present invention, the control of the field strength is desired in order to optimize the performance of the wound rotor synchronous machine throughout its torque and speed limits of operation. Preferably, the field current, which can be transmitted to the wound rotor via a rotary transformer, is generated in the same controller that synthesizes the currents applied to the stator of the wound rotor synchronous machine.

Advantageously, the wound rotor synchronous motor-generator system according to the present invention can be used as a traction motor in an electrically powered vehicle. The three phase stator signals of the wound rotor synchronous machine preferably are synthesized in a high power inverter, which advantageously can use insulated gate bipolar transistors (IGBTs) as pulse width modulators of a 15 kHz carrier under the control of a digital signal processor.

According to another aspect of the present invention, power is delivered to the wound rotor using an axial gap rotary transformer having a ferrite core. It will be appreciated that the use of a high frequency for the current transmission reduces the size and weight of the transformer. The secondary signal generated by the rotary transformer is full bridge rectified to provide direct current to the rotor field windings. Primary and secondary filter circuits are used to protect the rectifier diodes from unwanted transient overvoltages.

According to yet another aspect of the present invention, the wound rotor synchronous machine system incorporates the digital signal processor, the carrier frequency generator, and the IGBT cooling system of the stator controller to generate the current supplied to the rotary transformer.

BRIEF DESCRIPTION OF THE DRAWINGS

The preferred embodiments are described with reference to the drawings, in which like elements are denoted by like numbers, and in which.

DETAILED DESCRIPTION OF THE PREFERRED EMBODIMENTS

Figure 1:
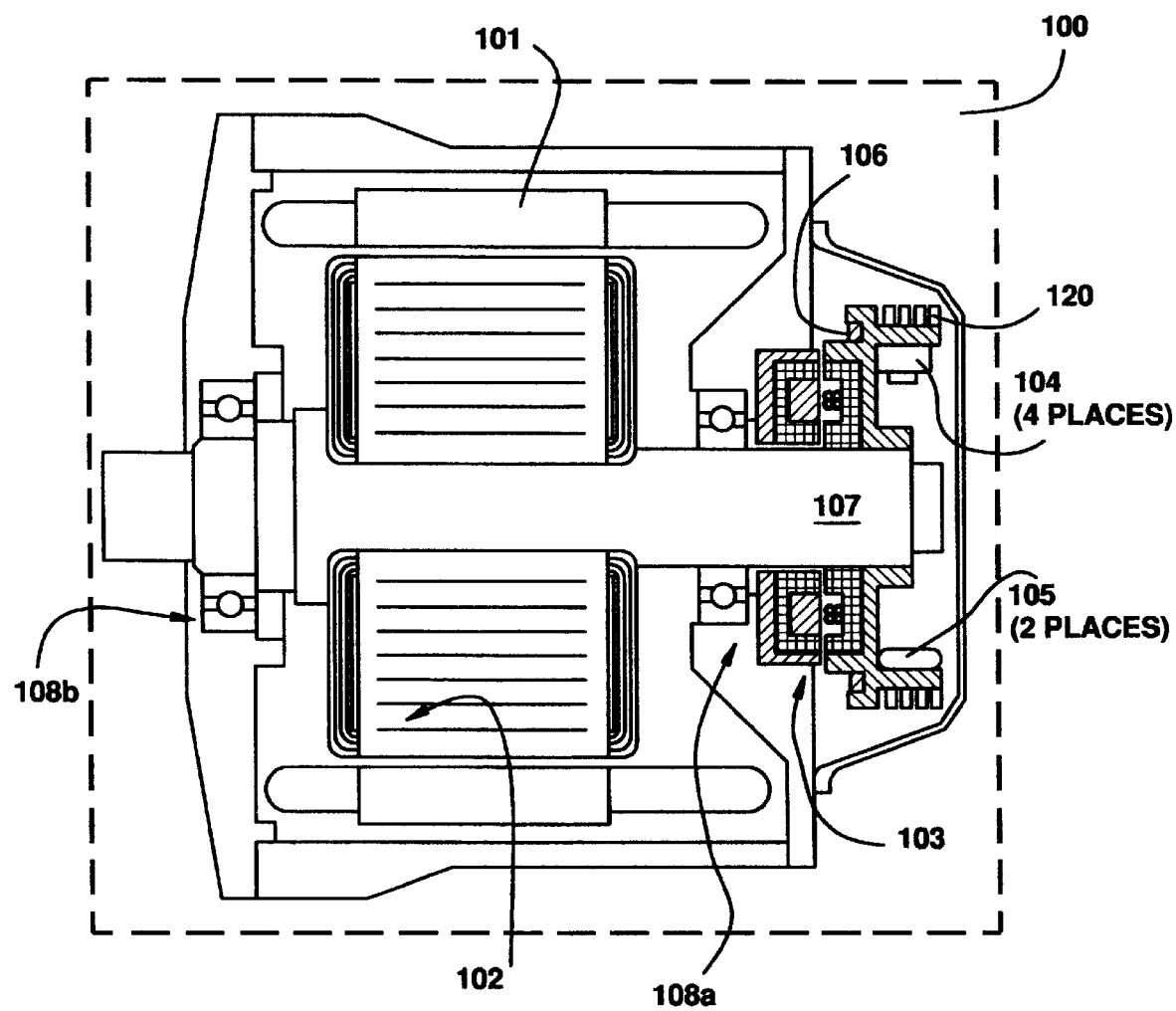
FIG. 1 is a interior view of a wound rotor motor-generator including a rotary transformer according to a preferred embodiment of the present invention.
Figure 2:
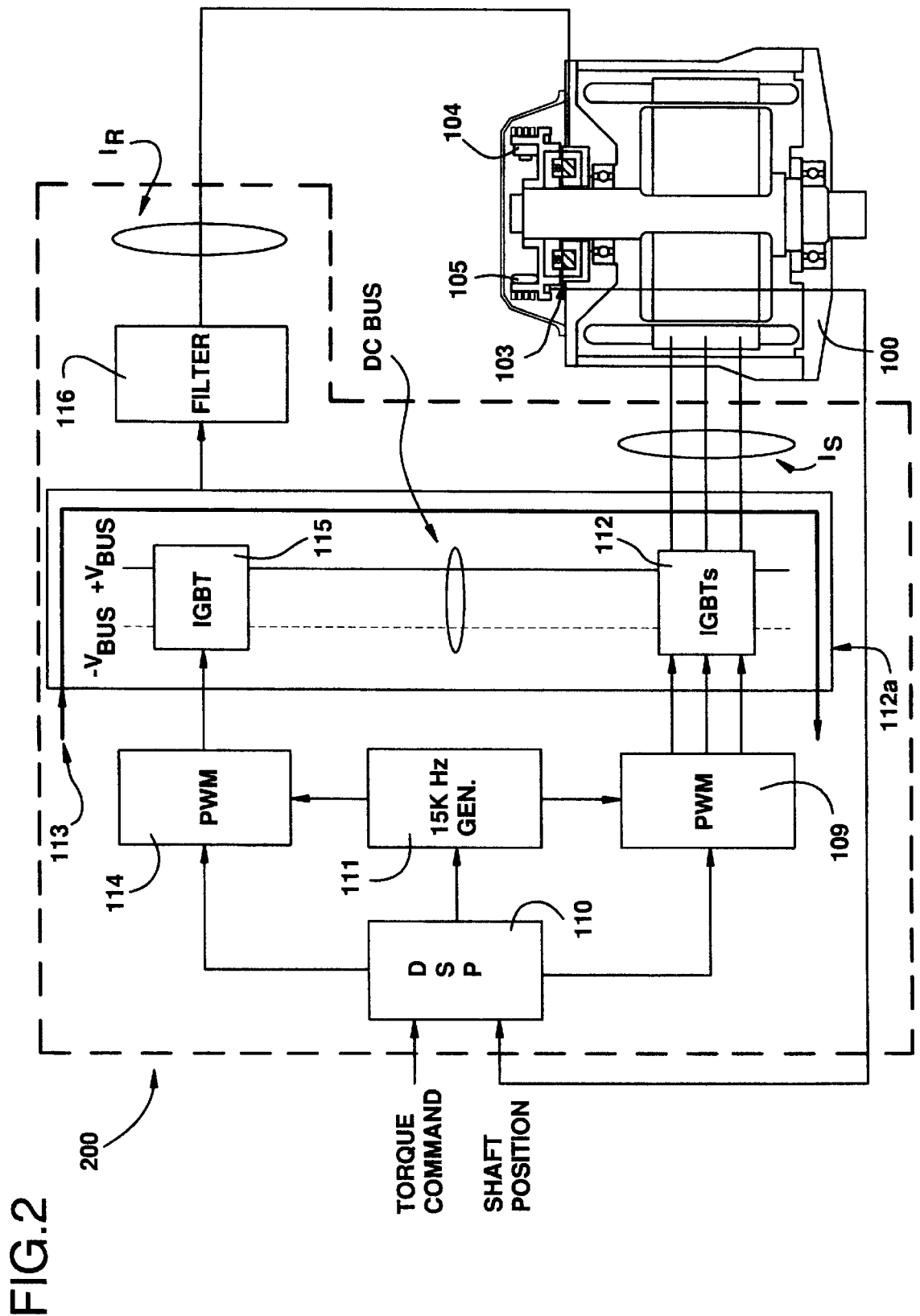
FIG. 2 is a block diagram of the motor controller utilizing the wound rotor motor-generator illustrated in FIG. 1.

A preferred embodiment according to the present invention is depicted in FIGS. 1–5, wherein the elements of a wound rotor motor-generator of the type according to the present invention are shown in FIG. 1. The motor-generator 100 includes a stator 101 which preferably surrounds a rotor 102, which rotates on a shaft 107 supported by bearings 108a and 108b. Preferably, stator 101 has a three phase multipole winding, with 6 or 8 poles being typical. Advantageously, the rotor 102 is of salient pole construction, with the windings arranged to provide alternating north and south poles. Additionally, the motor-generator contains a rotary transformer 103, a rectifier 104, a close coupled rotor power filter 105 and a shaft position indicator 106.

It will be appreciated that the torque developed by the motor-generator is a function of both the stator and the rotor currents. Advantageously, the controller 200 illustrated in FIG. 2 supplies not only the three phase stator currents $I_S$ but also the rotor current $I_r$ via the rotary transformer 103. In a exemplary case, the three phase signals generally denoted $I_S$ are synthesized in the controller 200 by pulse width modulator (PWM) circuit 109 under the supervision of a digital signal processor (DSP) 110 and using a 15 kHz carrier generator 111. Preferably, the power IGBTs 112 are capable of supplying more than 120 KW peak power in the form of three phase currents $I_S$ to the motor-generator 100. Beneficially, the IGBTs 112 are mounted, using a connection capable of high thermal conduction such as high thermal conductivity adhesive, to a liquid cooled plate 112a, which advantageously keeps the temperature of the IGBTs 112 within safe limits. The cooling liquid is circulated in hoses 113 between the cooling plate 112a and a heat exchanger not shown) using a pump (also not shown). It will be appreciated that the pump and radiator can be of any design capable of maintaining the IGBTs 112 below their maximum design temperature.

It will be recognized that the integration of the rotor current control subsystem into the same controller 200 which develops the needed stator currents $I_S$ permits the sharing of the DSP 110, the carrier signal generator 111, and the IGBT cooling system, illustrated by the cooling loop 113. Advantageously, the rotor current control subsystem consists of a PWM circuit 114, a IGBT power switch 115, and filter 116, whose collective output is the rotary transformer primary signal $I_r$. Sharing the DSP 110 allows the optimum value of rotor field current $I_{FC}$, which is a complex function of both the speed of the motor 100 and the desired output torque, to be readily calculated, since both pieces of information advantageously are always present in the DSP 110. It will be understood that the speed is a derivative of the shaft position.

Figure 3C:
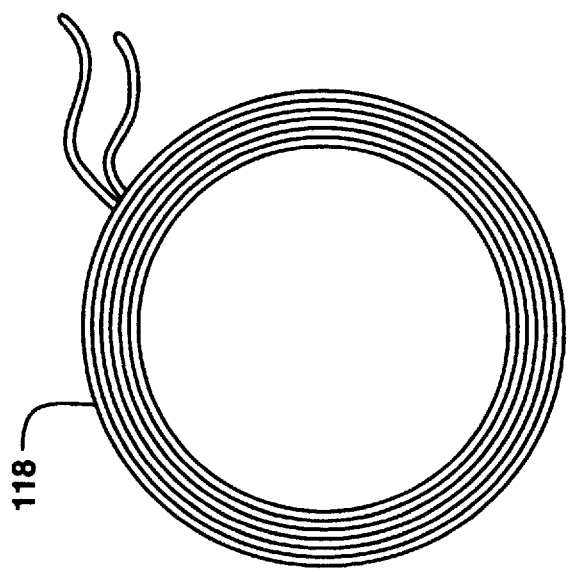
FIGS. 3A through 3C illustrate various elements of the rotary transformer included in the wound rotor motor-generator of FIG. 1.
Figure 3B:
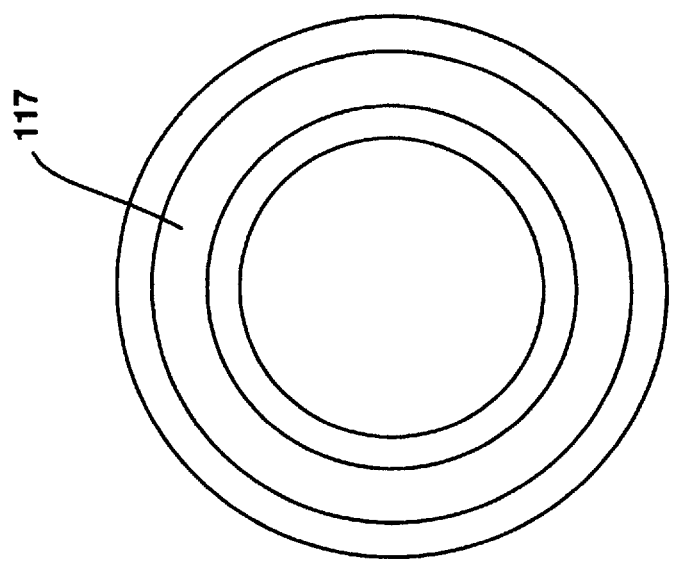
Figure 3A:
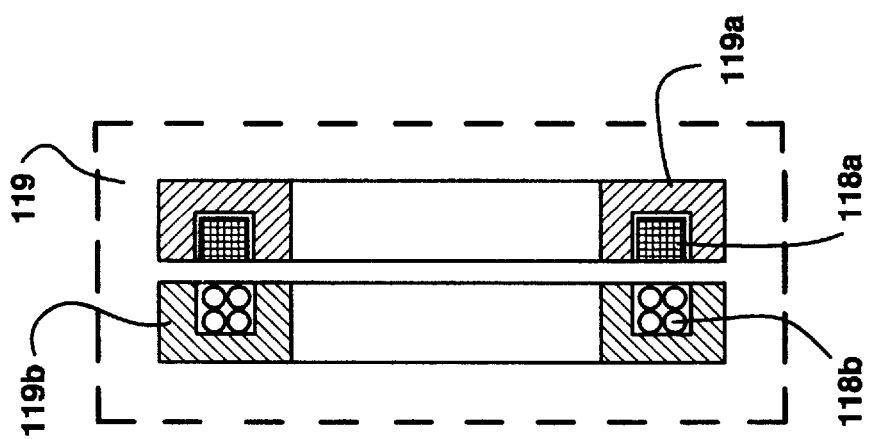

The rotary transformer 103 according to a preferred embodiment of the present invention shown in FIGS. 3A–3C consists of a stationary primary 119a and a rotating secondary element 119b, each including a ferrite core 117 and a coil of copper wire 118. It should be mentioned that exemplary, approximate core dimensions for a rotary transformer 103 capable of delivering 3000 watts of power to the field windings of wound rotor 102 are 92 millimeters outer diameter (OD), 54 millimeters inner diameter (ID), and 13 millimeters axial length (L). The axial gap shown in the assembly drawing 119 between the primary 119a and the secondary 119b is substantially equal to 0.75 millimeter (mm). It should also be mentioned that the high power to volume ratio of the rotary transformer 103 results from the use of the high frequency carrier, i.e., the 15 kHz signal produced by generator 111. Preferably, the primary coil 118a has 16 turns of No. 15 wire while the secondary coil 118b has 4 turns. Advantageously, this turns ratio of 4:1 matches the impedance of the rotor windings 102 and permits maximum current to be supplied to them.

It will be appreciated that a rectifier, and preferably a diode rectifier, is needed at the output of the rotary transformer to convert the alternating current of the rotary transformer 103 to the direct current Ifc which creates the field of the wound rotor 102. It will also be appreciated that the diodes 104 of FIG. 1 will be rotated at high speed as the wound rotor 102 rotates and, thus, will experience considerable centrifugal force at the top speed, e.g., 12,000 RPM or more, of wound rotor 102. The diodes 104 advantageously are mounted in an orientation relative to the centrifugal force field which forces the die into, rather than away from, the supporting baseplate 121. Thus, the mounting of the diodes 104 advantageously prevents stress induced open circuit failure.

Figure 4:
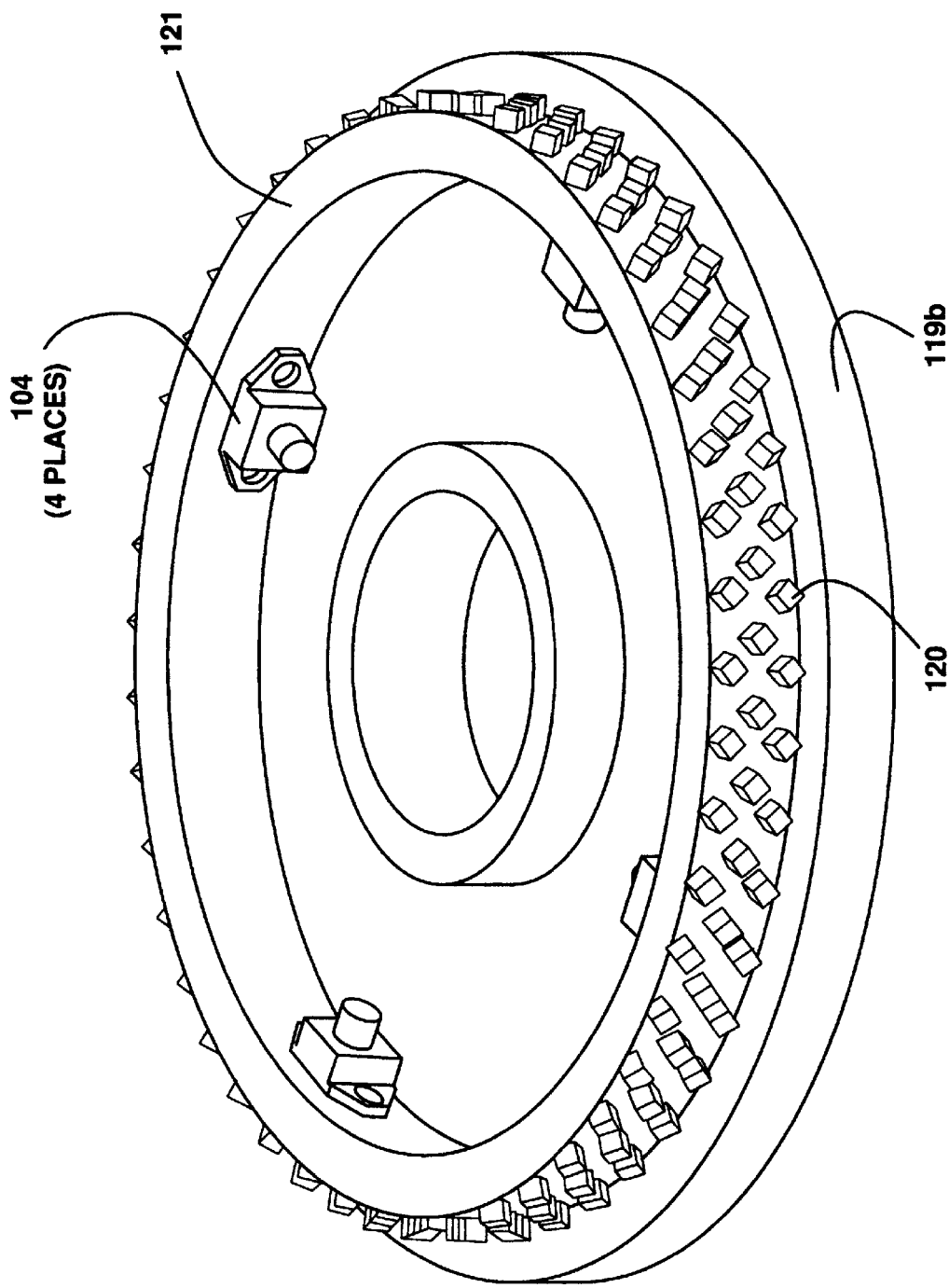
FIG. 4 illustrates the mounting arrangement for the diodes used in the wound rotor synchronous motor-generator depicted in FIG. 1.

A detailed illustration of the mounting arrangement is shown in FIG. 4. It should be mentioned that the mounting arrangement must alleviate stress to the diodes 104, and must also provide adequate cooling for the diodes 104. Since the rotor 102 itself may reach temperatures approaching the upper operating limit for the diodes 104, an air cooled heat exchanger 120 is provided on the diode mounting ring 121 to conductively cool the diodes 104 to a safe operating temperature. Preferably, the cooling air for the heat exchanger 120 is the inlet air provided for cooling the wound rotor 102. It should be mentioned that the direction of the airflow relative to the heat exchanger 120 ranges between axial and circumferential, depending on the speed of the wound rotor 102. The heat exchanger 120 couples to the airflow effectively in all possible directions of the relative air flow.

Figure 5:
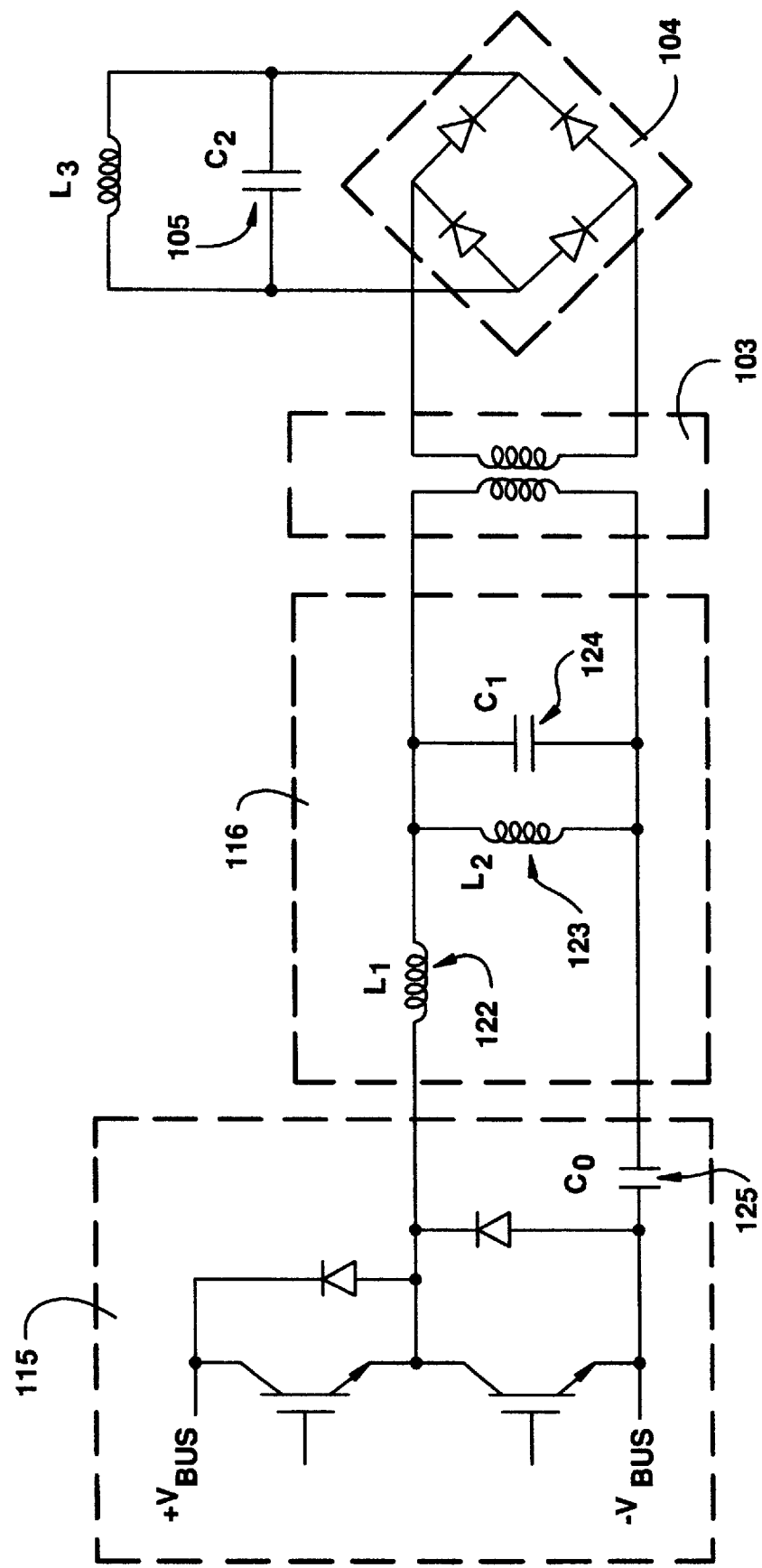
FIG. 5 is a schematic circuit diagram of the field control system according to the present invention.

The circuit diagram of the field control subsystem is shown in FIG. 5. Because of the large air gap needed to provide adequate clearance between the rotating and stationary elements 119a and 119b, respectively, of the rotary transformer 103, the leakage inductance is unusually high for a power transformer. This leakage inductance can resonate with stray capacitance to produce voltage overshoots when the transformer is excited directly by the PWM signals, which have rapid voltage swings over the fill D.C. bus range. The voltage overshoots on the secondary coil 118b of the rotary transformer 103 can cause failure of diodes 104 by causing their voltage ratings to be exceeded. Advantageously, the filter 116 on the primary side 119a of the rotary transformer 103 contains a series inductor 122 ($L_1$), which preferably is 50 $\mu$H (microhenries), a shunt inductor 123 ($L_2$), which advantageously can be a 22 $\mu$H inductor, and a shunt capacitor 124 ($C_1$), which can be a 5 $\mu$F (microfarad) capacitor in an exemplary case. Preferably, filter 116 converts the primary excitation from the nearly rectangular waveform which results from pulse width modulation by PWM circuit 114 and IGBT 115 with blocking capacitor 125 ($C_0$), which can be a 10 $\mu$F capacitor in an exemplary case, to a nearly sinusoidal waveform, which substantially reduces the overvoltage.

Advantageously, the $C_2$ capacitor 105 across the field winding of wound rotor 102 further improves the ratio of field current to the peak voltage seen by the rectifier diodes 104. In an exemplary case, capacitor $C_2$ can be a 6 $\mu$F capacitor.

Although the present invention was described with respect to control of the field strength of the wound rotor synchronous machine so as to optimize performance throughout its torque and speed limits of operation, the present invention is not limited to a particular motor type. Advantageously, present invention may be used for other types of motors and/or generators where the field current which is transmitted to the wound rotor can be delivered via a rotary transformer.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A field control system for a wound rotor synchronous motor-generator, comprising:

an adjustable power source operatively connected to the wound rotor synchronous motor-generator;

a rotary transformer disposed within the wound rotor synchronous motor-generator for receiving power from said adjustable power source and generating field current;

a rectifier receiving said field current and generating rectified field current applied to the wound rotor of the wound rotor synchronous motor-generator; and a filter serially connected between said power source and said rotary transformer for generating a sinusoidal waveform from a rectangular waveform produced by said stationary power source.

2. The field control system as recited in claim 1, wherein said rectified field current is adjusted to provide optimum motor-generator performance for all shaft speeds and torque demands.

3. The field control system as recited in claim 1, wherein the wound rotor synchronous motor-generator additionally has a stator energized by stator current, where said field control system further comprises a digital signal processor, and wherein said digital signal processor computes both said rectified field current and said stator current.

4. The field control system as recited in claim 1, wherein said filter comprises:

a first inductor serially connected between said power source and said rotary transformer; and a branch circuit including a second inductor and a capacitor connected in parallel with one another, and connected across the primary terminals of the rotary transformer.

5. The field control system as recited in claim 1, wherein said rectifier is a full wave bridge rectifier formed from a plurality of diodes.

* * * * *